Jan. 4, 1966 H. A. GORJANC 3,227,096
CARRIER CONTROL SYSTEMS
Filed July 3, 1961 3 Sheets-Sheet 1

FIG. I

INVENTOR.
HENRY A. GORJANC
BY
Williams, David, Hoffmann & Yount
ATTORNEYS

INVENTOR.
HENRY A. GORJANC

Jan. 4, 1966   H. A. GORJANC   3,227,096
CARRIER CONTROL SYSTEMS
Filed July 3, 1961   3 Sheets-Sheet 3

FIG. 3

INVENTOR.
HENRY A. GORJANC
BY
Williams, David, Hoffmann & Yount
ATTORNEYS

United States Patent Office 3,227,096
Patented Jan. 4, 1966

3,227,096
CARRIER CONTROL SYSTEMS
Henry A. Gorjanc, Wickliffe, Ohio, assignor to The Cleveland Crane & Engineering Company, Wickliffe, Ohio, a corporation of Ohio
Filed July 3, 1961, Ser. No. 121,655
5 Claims. (Cl. 104—88)

This invention relates to material handling equipment and particularly to carrier systems having a trackway and a carrier movable therealong.

The principal object of the present invention is the provision of a new and improved carrier system of the above noted type, having a number of different control areas along the trackway at which control areas certain predetermined functions or operations are performed and presettable means on the carrier for causing the predetermined functions to be performed when the carrier reaches one or more selected areas.

A further object of the present invention is the provision of a new and improved carrier system having a trackway, a carrier movable therealong, and a plurality of partial circuits which are selectively combined as the carrier moves about the trackway to control the performance of a predetermined function at one of a plurality of control areas along the trackway.

A further object of the present invention is the provision of a new and improved carrier system including a trackway, a carrier movable along the trackway, a plurality of control areas at spaced points along the trackway and at which predetermined functions are to be selectively performed, and means for controlling the performance of these functions including a plurality of partial circuits, a plurality of circuit make and break devices on said carrier controlling said plurality of partial circuits, and distinguishable means at each of said control areas to selectively actuate said electric circuit make and break devices to selectively connect different ones of said partial circuits.

A further object of the present invention is the provision of a new and improved carrier system having a plurality of groups of circuits controlling the operation of a carrier along a trackway, each circuit in each of the plurality of groups being effective when completed to effect a predetermined operation at a control area within a control section or group of control areas located along the path of the carrier, there being a plurality of control areas equal in number to the number of groups of circuits, means to preselect any one circuit of the group to be completed, and distinguishable means at control areas along the trackway actuating the completion of any selected circuit, the distinguishable means at the control areas in one control section corresponding to the arrangement of distinguishable means at the control areas in another control section.

A further object of the present invention is the provision of a new and improved carrier system as defined in the preceding object wherein means is provided to prevent the completion of any circuit in the plurality of groups except the selected circuit which is actuated by the distinguishable means at a control area within a control section.

Further objects and advantages of the present invention will be apparent from the following description made with reference to the accompanying drawings which form a part of this specification and in which:

FIG. 3 is a schematic diagram showing the arrangement of switch trippers located at the respective control areas along the trackway.

In general, the preferred and illustrated embodiment of the present invention includes an electrified, overhead, monorail trackway comprising a closed loop A and a self-propelled carrier adapted to be selectively dispatched from a loading station to any one of a plurality of work stations along the trackway at which the arrival of the carrier triggers a predetermined operation or operations and/or from any one of the work stations to the loading station or another of the work stations. The routing and work station to which the carrier is dispatched is controlled by distinguishable coded index means B at control areas along the trackway through which the carrier passes during its travel to a selected station and sensing means C on the carrier, shown in FIG. 2, for operating circuit controlling means D on the carrier in different combinations according to the sensed code arrangements of the code means, which circuit controlling means completes one of a plurality of circuits, selectable by an operator for performing a predetermined operation and completed when the carrier arrives at a predetermined control area. The electrical power to drive the carrier and control the circuits is provided in a conventional manner by collectors 10 and 11 which engage power conductor bars L2 and L3, respectively, in a conventional manner.

Figure 1:
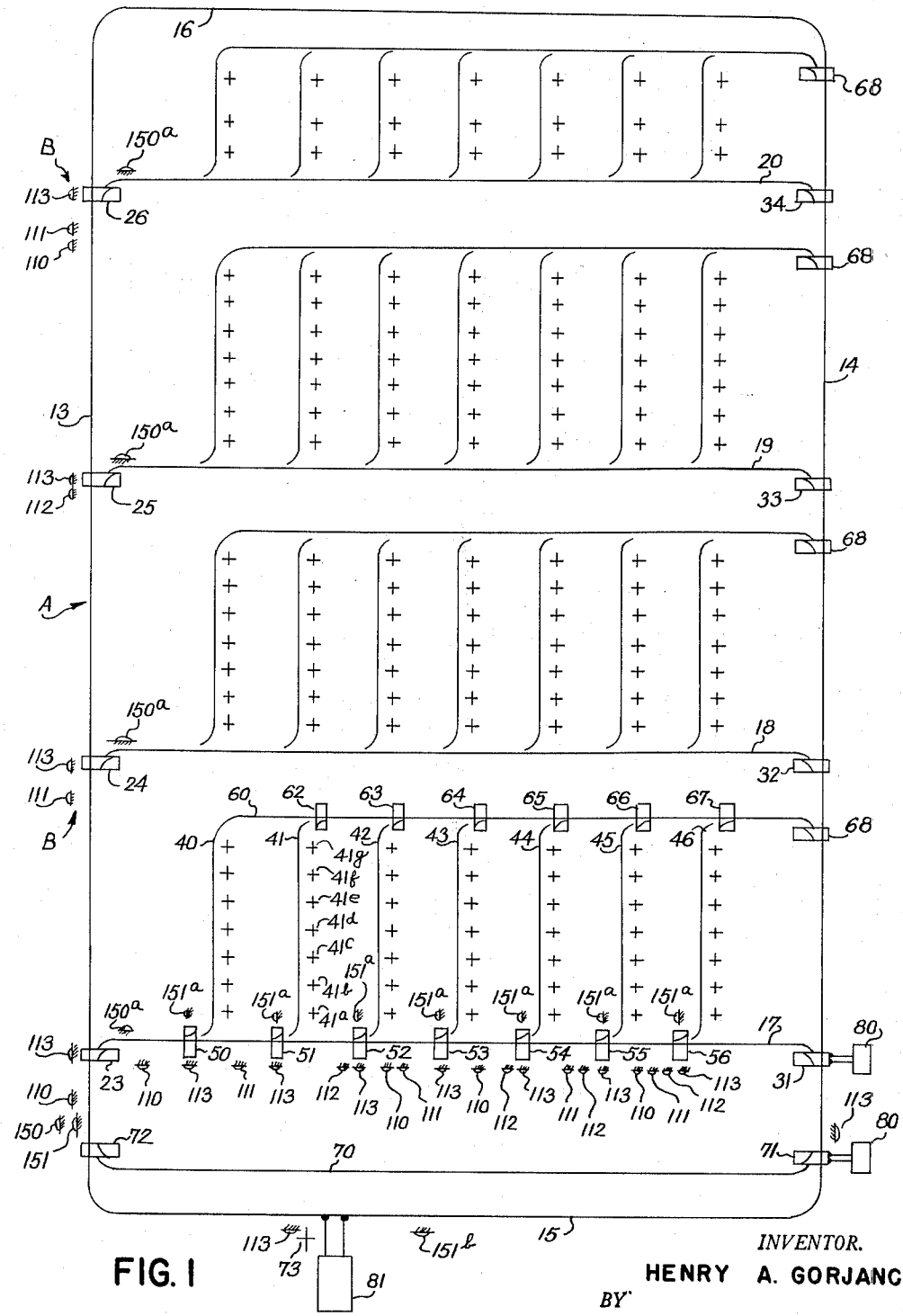
FIG. 1 is a diagrammatic plan view with parts broken away of a trackway for an overhead monorail carrier system embodying the present invention.

The trackway A of the electrified overhead monorail system includes a generally rectangular main track having main track side sections 13 and 14 and main track end sections 15 and 16 connecting opposite ends of the side sections 13 and 14 to form a closed loop. The trackway also includes a plurality of branch tracks, four of which are shown and designated 17, 18, 19 and 20. These branch tracks extend from the main track section 13 to the main track section 14 and are connectable therewith by movable entrance track switches 23, 24, 25 and 26 and exit track switches 31, 32, 33 and 34, respectively. A plurality of sub-branch tracks 40–46 extend from each of the branch tracks and are connected by movable entrance track switches 50–56 to the branch tracks and by movable exit track switches 62–67 to tracks 60, which in turn are connected by switches 68 to main track section 14. The subbranch track 40, as shown in FIG. 1, requires no exit track switch connecting it to track 60. A bypass track 70 extends between the main track sections 13 and 14 adjacent to the end section 15. The bypass track 70 is connected to the main track side sections 13 and 14 by movable entrance and exit track switches 71 and 72, respectively, which are positioned on opposite sides of the loading station 73, which is located in the main track end track section 15.

The entrance track switches 23–26 are movable from a first straight track position, wherein a carrier traveling along the main track section 13 can pass through the track switch and continue along the main track section 13 to a second curved position wherein a carrier traveling on the main track section 13 is diverted by a switch onto an adjacent branch track. Similarly, the track switches 50–56 are movable from a first position in which the carrier traveling along a branch track may continue along the branch track to a second curved position wherein a carrier traveling a branch track is diverted by a switch onto an adjacent subbranch track. The bypass entrance track switch 71 is movable in a similar manner between a first position wherein a carrier traveling along the track section 14 can pass through the track switch and continue along the track section to a second curved position wherein a carrier traveling along the section 14 is diverted by the switch onto the bypass track 70. These track entrance switches are normally in their first track positions and are moved to their second positions in response to the travel of the carrier, as will be more fully explained hereinbelow.

The exit track switches 31–34, 62–67, 68, and 72 are similar in construction to the entrance track switches and are movable from a first straight track position to a second curved track position to permit a carrier moving on either the straight or curved tracks to be directed through the track switch. Since in the preferred embodiment of the present invention a plurality of carriers are to travel simultaneously along the trackway A it is necessary to provide a priority system to prevent collision of the carriers and to prevent entry of a carrier onto a track switch which is not positioned to properly allow such an entry. This priority or blocking system includes insulated sections or segments of conductor bars in the conductors of the electrical system which supplies the power to drive the carriers. These sections or segments can be selectively energized or de-energized to properly control the passage of the carriers through the switch. Any suitable control may be utilized for this purpose (for example, the exit and entrance track switch blocking controls which are disclosed in my copending application Serial No. 32,388, filed on May 27, 1960 may be used). While it is to be understood that a blocking system is utilized for each of the switches, such blocking systems are shown schematically at 80 in FIG. 1 for switches 31 and 71 only.

Also, since a plurality of carriers are being directed around the trackway A, it is necessary to provide some means at the loading station which will prevent the carriers from colliding with each other at the loading station. Any suitable means may be used for this purpose and such a control is designated 81 in FIG. 1. This control, similar to the blocking system control, may include insulated conductor segments in the power system for supplying electrical power to the carriers. The conductor bar segments can be de-energized in response to a carrier stopping at the loading station and can be energized when the operator directs the carrier forwardly along the trackway A.

A plurality of work stations are positioned along the trackway subbranch tracks 40–46 at which the carrier may be stopped or some other operation or operations either on or off the carrier may be performed. Each of the subbranch tracks 40–46 have seven such stations or areas represented by crosses and designated by the reference numerals which designate the associated branch tracks with the letters a to g added thereto. It is to be understood, however, that as many stations as may be desired may be employed. The carriers are normally dispatched from the loading station 73 to one of the work stations along the subbranch tracks. As will presently be apparent, the carriers may also be dispatched to the loading station 73 from any of the work stations or may be dispatched from any one work station to any other work station.

A plurality of control areas are spaced along the trackway, each of which includes a coded or distinguishable means B adapted to be sensed by sensing means C on the carriers as they move about the track system for controlling movement of the carrier or performing some other on or off carrier operation. A first plurality of control areas are located along the side section 13 of the main branch track. Each of these areas includes one of the movable track entrance switches 23–26 located at the entrance to the branch tracks 17–20, respectively. A second plurality of control areas are located along each of the branch tracks 17–20. Each of these areas includes one of the movable track switches 50–56 located at the entrance to the subbranch tracks 40–46, respectively. A third plurality of control areas are spaced along the subbranch tracks 40–46, and each of these areas includes a working station. Two other control areas are located along the trackway A. One of these sections includes the bypass entrance track switch 71 and the other of these control areas includes the loading station 73.

In the preferred embodiment of the present invention the distinguishable means B located at the control areas in cooperation with the sensing means C on the carriers control the performance of off carrier functions, namely, actuation of the entrance track switches and on carrier functions, namely, stopping of the carrier drive motor at the work and loading stations.

The coded or distinguishable index means at the control areas comprise different arrangements of switch trippers which cooperate with switches that are located on the carrier and movable with the carrier. The arrangement of switch trippers at each of the control areas in the first plurality of control areas located along the track section 13 are different from each other. The arrangement of switch trippers at each of the control areas in the second plurality of control areas along the branch tracks 17, 18, 19 and 20 are also different from each other, as are the control areas along the subbranch tracks 40–46. While the arrangement of switch trippers in each of the first, second and third plurality of control areas are different from each other, the arrangements within each group are preferably similar to the arrangements within the other groups. More specifically, the code arrangement of switch trippers at the first control area in the first plurality of control areas is the same as the arrangement of switch trippers at the first control area in the second and third plurality of control areas. This is true also of the subsequent control areas, that is, the second, third, fourth, etc. control areas in the first plurality of control areas, are similar to the second, third, fourth, etc. control areas in the second and third plurality of control areas. It will be apparent from the description hereinbelow that the arrangement of switch trippers within a group may vary from the arrangement in the other groups.

The coding system embodied in different arrangements of switch trippers within the control areas is shown schematically in FIG. 3. Referring to FIG. 3, it can be seen that four switches 100–103 mounted on the carrier and comprising code sensing means are adapted to be tripped by trippers 110–113, respectively. Since different combinations of these trippers are placed at each of the control areas different combinations of switches are tripped by the switch trippers at each control area. At the first control area, for example, tripper 110 will close switch 100 and switch tripper 113 will close switch 103. Switches 101 and 102 will not be closed, since trippers 111 and 112 are not present at the first control area. In the same manner, at the second control area switch tripper 11 will close switch 101 and switch tripper 113 will close switch 103. At the third control area switch trippers 112 and 113 will enclose and close switches 102 and 103, respectively. Switch trippers 110, 111 and 113 will engage switches 100, 101 and 103, respectively, at the fourth control area. At the fifth control area switch trippers 110, 112 and 113 will engage switches 100, 102 and 103. At the sixth control area switch trippers 111, 112 and 113 will engage switches 101, 102 and 103, respectively, and finally, at the seventh control area switches 100, 101, 102 and 103 will all be energized by switch trippers 110, 111, 112 and 113, respectively. The arrangement of switch trippers shown in FIG. 3 corresponds to the arrangement of switch trippers located at the control areas along the main track section 13, the arrangement of switch trippers located along branch tracks 17, 18, 19 and 20 and also corresponds to the arrangement of switch trippers located along the subbranch tracks 40–46.

The limit switch 103 is a circuit completing switch, and limit switches 110–102 control the performance of predetermined functions at a selected control area within each plurality of control areas. For example, the selective actuation of switches 100–102 will cause one of the plurality of branch track entrance switches to be actuated. The number of possible selections or control areas within a plurality of control areas is limited by the number of different possible combinations of actuations of switches 100–102. This can be computed by using the formula $2^n-1$, $n$ being equal to the number of limit switches less the circuit completing limit switch. The system shown on the drawings uses three such limit switches 100–102, and this provides $2^3-1$, or 7 possible selections.

Figure 2:
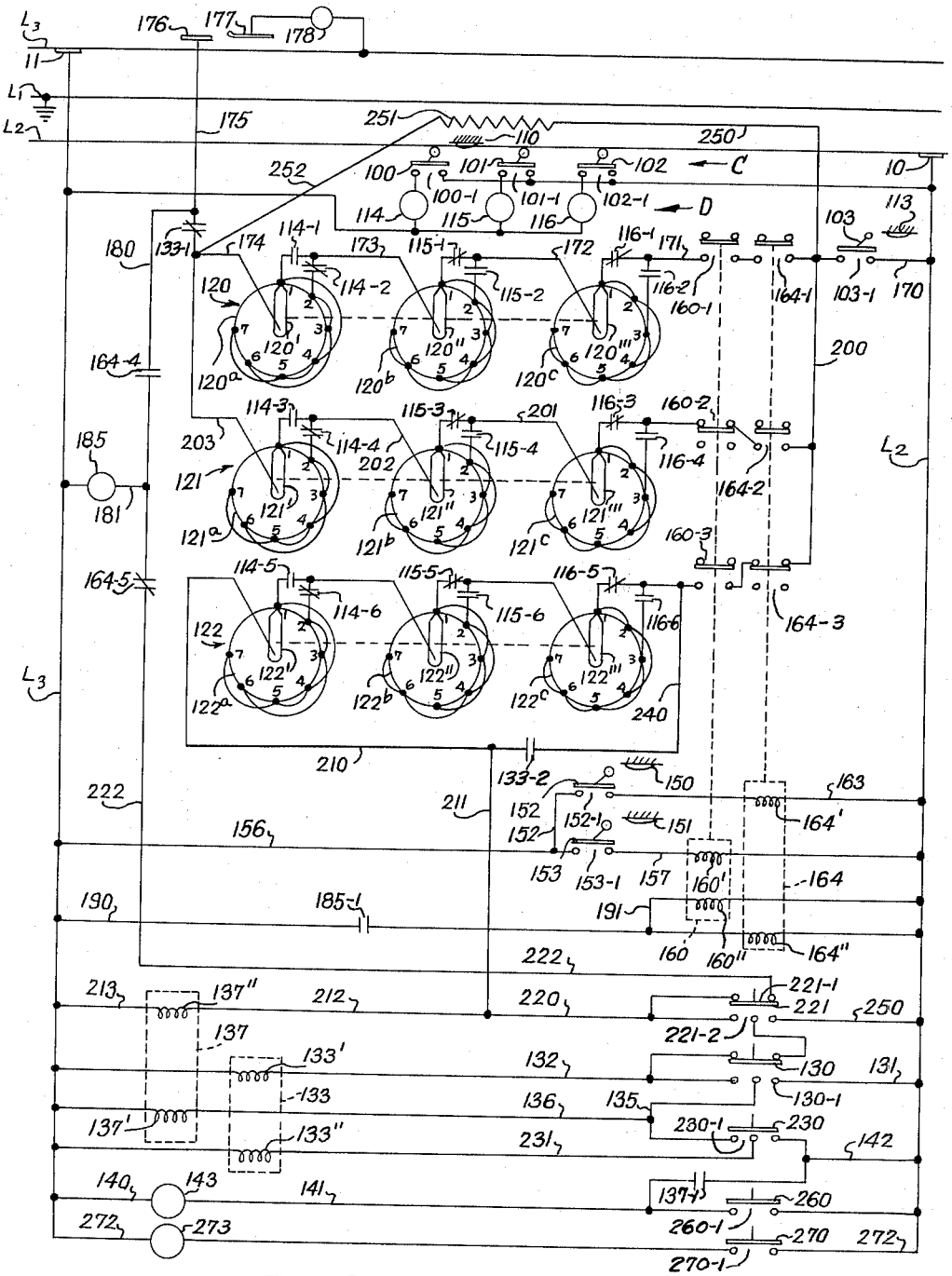
FIG. 2 is a schematic diagram of a trackway control area and carrier controls which cooperate to determine the destination of the carrier.

Adjustable means is mounted on the carrier and movable therewith and is settable to select the entrance track switch which will be moved to direct a carrier onto a branch track, which of the entrance switches 50–56 will be moved to direct a carrier onto a subbranch track, and at which of the control areas along the subbranch track the carrier will stop. This adjustable means comprises a plurality of dial means 120, 121 and 122, as can be seen in FIG. 2. Each of the dial means consists of three dials, designated by the numeral used to designate the dial means with $a$, $b$, and $c$ added, each having seven electrical contacts spaced annularly about the axis of the dial and a rotatable contact arm. The contact arms for each of the dials 120a, 120b, 120c are mechanically interconnected so that when one is rotated all are rotated. This is true also of the contact arms of adjustable dials 121a, 121b, 121c and 122a, 122b, 122c.

The contacts on the dial means 120 represents the control areas spaced along the track section 13 and therefore represent the track switches which are to be moved to direct the carrier onto a branch track. The contacts on the dial means 121 represent the control areas spaced along the subbranch tracks 17, 18, 19 and 20 and therefore determine which of the track switches 50–56 is moved to a position to direct the carrier onto a subbranch track. The contacts on the dial means 122 represent the control areas spaced along the subbranch tracks 40–46 and are settable to determine at which of the control areas along the subbranch tracks the carrier is stopped. For example, if it were desired to direct the carrier to the work station designated 41c, dial 120 would be set at 1, therefore causing the first track entrance switch 23 to be moved to direct the carrier onto subbranch track 17, dial means 121 would be set at 2 thereby causing the track entrance switch 51 to direct the carrier onto the second subbranch track 41, and dial means 122 would be set at 3, thereby causing the carrier to be stopped at the third station on the subbranch track 41, namely station 41c. In a similar manner, the dials 120, 121 and 122 can be set to direct the carrier to any one of the work stations in the trackway.

The contacts of each dial are electrically connected in a predetermined arrangement. The dials 120a, 121a and 122a are electrically connected in a similar manner. Contacts 1, 4, 5 and 7 of these dials are connected and contacts 2, 3 and 6 are electrically connected. Contacts 1, 3, and 5 of dials 120b, 121b and 122b are connected and contacts 2, 4, 6 and 7 of these dials are connected. On dials 120c, 121c and 122c contacts 1, 2, 4 are connected and contacts 3, 5, 6 and 7 are connected. It is to be understood that the specific wiring of the dial means 120, 121, 122 could be different from each other, which would necessitate different arrangements of trippers to actuate the switches to energize the desired circuit.

The sensing means, switches 100–103, control the circuits which the dial contacts are in. Switch 100 has contacts 100–1 in a circuit between power lines L2 and L3 and relay 114 is also in that circuit. Relay 114 has normally open contacts 114–1, 114–3 and 114–5 in a circuit connecting the dials 120a to 120b, 121a to 121b, and 122a to 122b. Relay 114 also has normally closed contacts 114–2, 114–4 and 114–6 in circuits connecting these same dials. Switch 101 has contacts 101–1 in a circuit between power lines L2 and L3, and which circuit includes a relay 115. Relay 115 has normally closed contacts 115–1, 115–3 and 115–5 in a circuit connecting the contact arms of the dials 120b to 120c, 121b to 121c, and 122b to 122c, respectively. Relay 115 also has normally open contacts 115–2, 115–4, 115–6 connecting the contact arms of these same dials. Switch 102 has contacts 102–1 in a circuit between the power lines L2 and L3, and which circuit includes a relay 116. Relay 116 has normally closed contacts 116–1, 116–3, and 116–5 in a circuit connecting the contact arm of dials 120c, 121c and 122c to the power line L2, respectively. Relay 116 has normally open contacts 116–2, 116–4 and 116–6 in a circuit connecting the power line L2 to the dials 120c, 121c and 122c, respectively. It is thus apparent that when the switches 100, 101 or 102 are closed by the trippers 110, 111 and 112 relays 114, 115 and 116 will be actuated, thus closing their normally open contacts and opening their normally closed contacts. Thus by properly and selectively energizing the switches 100, 101 and 102 a variety of different circuits can be completed through the dials 120, 121 and 122. These different circuits are completed by connecting various partial circuits which include the dial contact arms to complete a given circuit through the dial means 120, 121 and 122.

The operator manually sets dial means 120, 121 and 122 so that the carrier will be directed to a given work station. After the operator has set the dial means 120, 121 and 122 for the station at which the carrier is to be stopped, the operator presses the button 130. This completes a circuit between the power lines L2 and L3 through conductor 131, now closed contacts 130–1, conductor 132, and relay coil 133' of relay 133. Energization of the relay coil 133' causes the contacts 133–1 and 133–2 of the relay 133 to maintain their normally closed and normally open positions, respectively. When the operator presses the button 130 another circuit is completed between the power lines L2 and L3 through conductor 131, now closed contacts 130–1, conductor 135, and relay coil 137' of relay 137. Energization of the relay coil 137' causes the contacts 137–1 to close and thus completes a circuit through conductor 140 connected to the power line L3, motor control 143, conductor 141, now closed contacts 137–1, conductor 142. The flow of current through motor control 143 causes the carrier to move forwardly.

As the carrier moves forwardly trippers 150 and 151 engage switches 152, 153, respectively, which are mounted on the carrier and movable with the carrier. This completes a circuit from the power line L3 through conductor 156, now closed contacts 153–1 of the switch 153, conductor 157, and coil 160' of the relay 160 to power line L2. Energization of the relay coil 160' causes the contacts 160–1 of the relay coil 160 to be closed. The closing of the switch 152 by the tripper 150 causes a circuit to be completed from the power line L3 through conductors 156 and 162, now closed contacts 152–1 of the switch 152, relay coil 164' of the relay 164 to the power line L3. Energization of the relay coil 164' causes the contacts 164–1 of the relay coil to be closed.

As the carrier continues to move along the trackway 13 tripper 113 will engage switch 103 and cause the contacts 103–1 of switch 103 to be closed. While the switch 103 is closed the switch 100 will also be closed by engagement with the tripper 110 at the first control area along the main track 13. If the dial 120 has been set to cause the carrier to be moved onto the first branch track 17, as above set forth, energization of the switch 100, which, as explained hereinabove, causes relay 114 to close normally open contacts 114–1 and open normally closed contacts 114–2 completes a circuit from power line L2 through conductor 170, now closed contacts 103–1, closed contacts 164–1 and closed contacts 160–1 of relays 164 and 160, respectively, partial circuit 171, normally closed contacts 116–1 of relay 116, the contact arm 120''', partial circuit 172, normally closed contacts 115–1 of relay 115, contact arm 120'' of dial 120b, partial circuit 173, now closed contacts 114–1 of the relay 114, contact arm 120', partial circuit 174, normally closed contacts 133–1, line 175 to switch actuator 176 mounted on the carrier. Thus when the switch actuator 176 engages the switch actuating segment 177 a circuit is completed to the power line L3 from L2 through the switch actuating motor relay 178, thus causing the switch motor to move the switch to a branch track position directing the carrier onto the branch track. In a similar manner, any of the entrance track switches 23, 24, 25, 26, etc. may be actuated to cause the carrier to be directed onto one of the branch tracks. For example, if the contact arms of the dials 120a, 120b, and 120c were set at the second contact points no circuit would be completed through the contact arms when the relay 114 is energized by tripper 110, closing switch 100. However, relay 115, when energized at the second station by tripper 111, closing the switch 101, closes the contacts 115–2 and opens the contacts 115–1. This would complete a circuit through the contacts 115–2 and through the contact arms 120', 120'', 120''' to the actuator segment 176 to engage the segment of the switch 124 to cause the switch 124 to move to a position in which the carrier would be directed onto branch track 118.

Any circuit completed through the dial 120 as discussed above, would also complete a circuit through now closed contacts 164–4 of the relay 164, conductors 180 and 181 and relay 185. Energization of the relay 185 causes the relay contacts 185–1 to be closed and thus causes the circuit to be completed from the power line L3 to the power line L2 through conductor 190, now closed contacts 185–1, conductor 191, and relay coil 164''. Energization of the relay coil 164'' causes the contacts 164–1 and 164–4 to return to their normal open positions. Also, a circuit is completed from the power line L3 to the power line L2 through the conductor 190, now closed contacts 185–1, conductor 191, and coil 160'' of the relay 160. Energization of the relay coil 160'' causes the contacts of the relay 160–1 to return to their normal open position. Thus the energization of the relay 185 can be seen to open the circuits which had been completed through the dial 120.

After the carrier has moved through a branch track entrance switch, tripper 150a, shown in FIG. 1 again engages switch 152, closing the contacts 152–1 of the switch 152. This energizes the relay coil 164', thus causing contacts 164–2 and 164–4 to close and causes contacts 164–3 and 164–5 to open. By way of example let it be assumed that the operator has adjusted the dial 121 to cause the carrier to be directed into the second subbranch track 41. Thus at the control area adjacent the track entrance switch 51 tripper 113 will close the switch 103, thus closing the contacts 103–1 of the switch 103 and tripper 111 will close the contacts 101–1 of switch 101, thereby energizing the relay 115 which in turn causes the normally open contacts 115–4 to close and the normally closed contacts 115–3 to open. This causes a circuit to be completed from the power line L2 to the actuator segment 176 on the carrier through conductor 170, now closed contacts 103–1 of the switch 103, conductor 200, now closed contacts 164–2 of the relay 164, normally closed contacts 160–2 of the relay 160, normally closed contacts 116–3 of relay 116, and contact 1 and contact 2 of the dial 121c, the contact arm 121''', partial circuit 201, now closed contacts 115–4, contact arm 121'', partial circuit 202, normally closed contacts 114–4, contact arm 121', partial circuit 203 and conductor 175 to cause L2 potential to be applied to the actuator segment 176. When the actuator segment 176 engages the actuator segment 177 of the switch 51 the switch 51 will be caused to move to a position in which the carrier is directed onto the subbranch track 41. In a manner similar to that discussed above, a circuit is also completed through the now closed contacts 164–4 of the relay 164 and relay 185 which closes the normally open contacts 185–1. When the contacts 185–1 are closed a circuit is completed from the power line L3 through conductor 190, now closed contacts 185–1, and the relay coils 160'' and 164'' to cause the contacts of the relays 160 and 164, respectively, to return to their normal positions. As discussed above, if the dial 121 were set at any of the other contacts the corresponding switch 50–56, respectively, would be actuated to cause the carrier to be directed into any one of the subbranch tracks.

As the carrier is directed into the subbranch track 41 the tripper 151a closes the switch 152, thereby closing the contacts 153–1. This completes a circuit from the power line L3 through conductor 156, now closed contacts 153–1, conductor 157, and relay coil 160' of the relay 160. This causes the contacts 160–3 of the relay coil 160 to be closed. When the trippers actuate the corresponding switches, switches 102 and 103, at the station 41c a circuit is completed from the power line L2 through conductor 170, now closed contacts 103–1 of the switch 103, conductor 200, normally closed contacts 164–3 of the relay 164, now closed contacts 160–3 of the relay 160, the dial 122, as discussed with respect to the dials 120 and 121, conductors 210, 211 and 212, coil 137'' of the relay 137, and conductor 213 connected to power line L3. The passage of current through the coil 137'' of the relay 137 causes the normally open contacts 137–1 of the relay 137 to open. The opening of the contact 137–1 opens the circuit through the motor control 143 which controls the motor for moving the carrier forward. Thus, since the motor no longer is operating, the carrier is stopped. At the same time, a circuit is completed through conductor 220, closed contacts 221–1 of the stop button 221, conductor 222, the normally closed contacts 164–5 of the relay coil 164, and the relay 185 to the power line L3. Energization of the relay 185 causes the relay contacts 185–1 to close. This completes a circuit through the conductor 190 through the now closed relay contacts 185–1 conductor 191, and relay coil 160'', to power line L2. The passage of current through the relay coil 160'' causes the closed contacts 160–3 to be returned to their normally open position.

In the preferred and illustrated embodiment the operator, after having unloaded the carrier or performed the desired operation at the work station 41c, can now either direct the carrier to the loading station 73 or to any other of the work stations on the trackway A. In order to cause the carrier to be returned to the loading station 73 the operator presses the button 230, which closes the contacts 230–1 and then causes a circuit to be completed from the power line L2 through the conductor 142, now closed contacts 230–1, conductor 136 and relay coil 137' of the relay 137 to the power line L2. The passage of current through the relay coil 137' causes the carrier to move forwardly as discussed above. The closing of the contacts 230–1 of the switch 230 also completes a circuit from the power line L2 through conductor 142, now closed contacts 230–1 of the switch 230, conductor 231, and relay coil 133'' of the relay 133 to the power line L3. The passage of current through the relay coil 133'' of the relay 133 causes the contacts 133–1 of the relay 133 to open and the contacts 133–2 of the relay to close. The carrier thus is caused to move through the track exit switch 62, which has been properly positioned by the operator along the track 69 through the track exit switch 68 also properly positioned by the operator along the main track 14, through the bypass track 71 and onto the main track section 15. While the exit switches are manually controlled, they could be automatically controlled by the movement of the carrier.

As the carrier travels along the main track section 15, tripper 151b closes the contacts 153–1 of the switch 153. This causes a circuit to be completed from the power line L3 to the power line L2 through the conductor 156, now closed contacts 153–1 of switch 153, conductor 157, and coil 160′ of the relay 160 to the power line L2. The passage of current through the relay coil 160′ of the relay 160 causes the contacts 160-3 of the relay 160 to be closed. As the carrier continues to move along the main track line 15 switch 103 is closed by the tripper 113. This completes a circuit from the power line L2 to the power line L3 through line 170, now closed contacts 103-1 of the switch 103, line 200, normally closed contacts 164-3 of the relay 164, now closed contacts 160-3 of the relay 160, conductor 240, now closed contacts 133-2 of the relay 133, conductors 211 and 212, relay coil 137″, and conductor 213 which is connected to the power line L3. The passage of current through the relay coil 137″ causes the contacts 137-1 to open. This opens the circuit from the power line L3 to the power line L2 in which the motor control 143 is connected. The motor control 143, which causes the carrier to move in a forward direction, is thus provided with no current and thus the carrier is stopped. At the same time, a current flows from the power line L2 to the power line L3 through conductor 170, closed contacts 103-1, conductor 200, normally closed contacts 164-3 of the relay 164, now closed contacts 160-3 of the relay 160, conductor 240, now closed contacts 133-2 of the relay 133, conductors 211, 212, 220, and 222, normally closed contacts 164-5 of the relay 164, conductor 181, and relay coil 185, which is connected to the power line L3. The passage of current through the relay coil 185 causes the relay coil contacts 185-1 to close. This completes a circuit from the power line L3 through conductor 190, now closed contacts 185-1 of the relay coil 185, conductor 191 and relay coil 160″ of the relay 160 which is connected to the power line L2. The passage of current through the relay coil 160″ causes the contacts 160-3 to return to their normal position and thus the operator at the loading station can direct the carrier again to any of the working stations desired in a manner as described above.

As previously pointed out, the operator at any of the work stations may direct the carrier to any of the other work stations. This is accomplished by closing the switch 130, which causes the switch contacts 130-1 to close, thus completing a circuit from the power line L2 to the power line L3 through conductor 131, now closed contacts 130-1, conductor 132, and relay coil 133′, which is connected to the power line L3. The passage of current through the relay coil 133′ causes the contacts 133-1 and 133-2 of the relay coil 133 to return to their normal positions, namely, closed and open, respectively. The closing of the contacts 130-1 also completes a circuit from the power line L2 through conductor 131, now closed contacts 130-1, conductors 135 and 136, and relay coil 137′ of the relay 137, which is connected to the power line L3. The passage of current through the relay coil 137′ causes the contacts 137-1 of the relay 137 to be closed. This causes the completion of a circuit from the power line L2 to the power line L3 through the conductors 142, now closed contacts 137-1, conductor 141, motor control 143, and conductor 140 which is connected to the power line L3. The motor control 143 causes the carrier to be moved in a forwardly direction and the carrier moves out of the subbranch track 41 through the subbranch exit track switch 62 to the track 60, branch exit track switch 68 to the main track section 14. As the carrier approaches the bypass track entrance switch 71 tripper 113 closes the switch 103. The closing of the contacts 103-1 of switch 103 causes a circuit to be completed from power line L2 to power line L3 through the conductor 170, now closed contacts 103-1, conductor 250, resistor 251, conductor 252, now closed contacts 133-1, conductor 175 to switch actuator 176.

When the switch actuator 176 on the carrier engages the switch actuator segment 177 a circuit is completed to the power line L3 through the relay coil 178 of the switch actuating motor. This causes the motor of the switch 71 to move the switch to a position in which the carrier is directed onto the bypass track 70. The track switch relay 178 at by-pass track entrance switch 71 operates on a lower voltage than the relays at the other track switches, and it will operate with the resistor 251 in the circuit. Thus the carrier bypasses the loading station 73 and moves through the exit branch track switch 72 and is directed to the desired work station in the same manner as if it had been directed from the loading station.

It should be noted that in order to permit the operator to manually control the movement of the carrier closing of the switch 221 will close the switch contacts 221-2, thus completing a circuit from the power line L2 through conductor 250, now closed contacts 221-2 of the switch 221, conductor 251, conductors 220 and 212, and relay coil 137″ to the power line L3. Passage of current through the coil 137″ causes the carrier to stop. Thus the operator can manually stop the carrier at any position. Similarly, the carrier may be moved forwardly manually simply by closing the switch 260, thus closing the contacts 260-1 of the switch 260 and connecting the motor control 143 through the conductors 140 and 141 to the power lines L2 and L3. This causes the carrier to move forwardly until the operator releases the button 260. This is commonly called a "forward inch" mechanism. The carrier also can be moved in a reverse direction simply by pressing the button 270, thus closing the contacts 270-1. This completes a circuit from the power line L2 through the line 272, now closed contacts 270-1, through the reverse motor control 273 and conductor 272 connected to power line L3. This causes the carrier to move in a rearward direction.

While the preferred and illustrated embodiment of the present invention has been described in considerable detail, it is to be understood that the number of dials could be reduced or increased to reduce or increase the number of control stations to which the carrier could be directed. Also, the use of rectifiers in a conventional manner could be utilized to double the number of branch, subbranch and work stations at each of the control areas.

It is also to be understood that instead of switches which actuate relays having contacts in the dial circuits, collector bars could be utilized to actuate the relays and the distinguishable means in such a situation would be insulated and noninsulated conductor bars located at the control areas. Also, if desired, the switch contacts themselves could be placed in the dial circuits, thus eliminating the need for the relays which are actuated by the switches in the preferred embodiment. Thus it is apparent that the present invention resides in certain novel features of construction combinations and arrangements of parts that are not limited to the construction shown or the uses referred to and it is my intention to cover all adaptations, modifications and changes which come within the practice of those skilled in the art to which the invention relates and the scope of the appended claims.

Having described my invention, I claim:

1. In a carrier system, a trackway including a first track and a plurality of second tracks branching from said first track, a carrier movable along said trackway, a plurality of track switches movable from a first position in which said carrier is permitted to pass on said first track to a second position in which said carrier is directed onto one of said second tracks, a plurality of control areas located at spaced points along each of said second tracks, a first selector settable to select which of said track switches is to be moved to its said second position and including at least a pair of selector members having a plurality of first circuits therebetween, each of said first circuits being effective when completed to cause movement of a different track switch to direct said carrier onto a different one of said second tracks, a second selector settable to select at which of said control areas a predetermined function is to be performed and including at least a pair of selector members having a plurality of second circuits therebetween, each of said second circuits being effective when completed to cause a predetermined operation to be performed at one of said control areas, and control means for completing said first and second circuits including circuit make and break devices on said carrier having contact means in said first and second circuits, distinguishable means along said first track positioned adjacent said track switches in first predetermined code arrangements for actuating said circuit make and break devices in accordance with said predetermined code arrangements including control means on said carrier operable between first and second positions, said control means when in its first position connecting said first plurality of circuits for operation and disconnecting said second plurality of circuits, and when in its second position connecting said second plurality of circuits for operation and disconnecting said first plurality of circuits, respectively, and trip means along said second tracks and positioned in advance of said control areas therealong for actuating said control means from its first to its second position.

2. A carrier system as defined in claim 1 wherein said circuit make and break devices on said carrier include a plurality of relays having contact means in said first and second circuits and a plurality of switches for actuating said relays, and said distinguishable means includes switch trippers for actuating said switches in accordance with said predetermined code arrangement.

3. A carrier system as defined in claim 1 wherein said first track comprises a closed loop and said second tracks extend from one portion of said closed loop to another portion thereof, and further including a loading station on said first track, a bypass track extending from a first portion of said closed loop on one side of said loading station to a second portion of said closed loop on the opposite side of said loading station, and means for directing the carrier from any of said control areas through said bypass track to any other of said control areas.

4. In a carrier system, a trackway including a first track, a plurality of second tracks branching from said first track and a plurality of third tracks branching from said second tracks, a carrier movable along said trackway, a first plurality of track switches each of which is movable from a first position in which said carrier is permitted to move on said first track to a second position in which said carrier is directed onto one of said second tracks, a second plurality of track switches each of which is movable from a first position in which said carrier is permitted to move on said second tracks to a second position in which said carrier is directed onto one of said third tracks, a plurality of control areas located at spaced points along each of said third tracks, a first selector settable to select which of said first plurality of track switches is to be moved and including at least a pair of selector members having a plurality of first circuits therebetween, each of said first circuits being effective when completed to cause movement of a different track switch of said first plurality of track switches to direct said carrier onto a different one of said second tracks, a second selector settable to select which of said second plurality of track switches is to be moved and including at least a pair of selector members having a plurality of second circuits therebetween, each of said second circuits being effective when completed to cause movement of a different track switch of said second plurality of track switches to direct said carrier onto a different one of said third tracks, a third selector settable to select at which of said control areas a predetermined operation is to be performed and including at least a pair of selector members having a plurality of third circuits therebetween, each of said third circuits being effective when completed to cause predetermined operations to be performed at one of said control areas, and control means for selectively completing one of said plurality of first, second, and third circuits including circuit make and break devices on said carrier having contact means included in said first, second, and third circuits, distinguishable means along said trackway positioned adjacent said track switches and said control areas in predetermined code arrangements for actuating said circuit make and break devices in accordance with said predetermined code arrangements, at least one code arrangement adjacent one of said first track switches corresponding to a code arrangement adjacent one of said second track switches and at one of said control areas, and means for preventing completion of any of said plurality of second and third circuits as said carrier travels along said first track and completion of any of said first and third circuits as said carrier travels along said second tracks and completion of any of said first and second circuits as said carrier travels along said third tracks, including control means on said carrier operable between first, second and third conditions, said control means in said first condition connecting said first plurality of circuits for operation and disconnecting said second and third plurality of circuits and in said second condition connecting said second plurality of circuits for operation and disconnecting said first and third plurality of circuits and in said third condition connecting said third plurality of circuits for operation and disconnecting said first and second plurality of circuits, first trip means along said second tracks in advance of said second plurality of track switches for actuating said control means from its first to its second condition and trip means along said third tracks in advance of said control areas for actuating said control means from its second to its third condition.

5. In a carrier system, a trackway, a conveyor movable along said trackway, first and second control sections along said trackway, each section having a plurality of control areas therein located at spaced points along said trackway and at which predetermined functions are to be performed, first selector means settable to select the control area in said first control section at which said predetermined function is to be performed and including at least a pair of selector members having a plurality of first circuits therebetween, each of said first circuits being effective when completed to cause said function to be performed at one of said control areas in said first control section, a second selector means settable to select a control area in said second control section at which the predetermined function is to be performed and including at least a pair of selector members having a plurality of second circuits therebetween, each of said second circuits being effective when completed to cause said function to be performed at one of said control areas in said second control section, circuit make and break devices on said carrier having contacts in said first and second circuits and selectively actuatable to complete a different one of said first circuits and a different one of said second circuits, distinguishable code means at a plurality of said control areas to selectively actuate said circuit make and break device to complete said circuits as said carrier moves along said track, at least one of said code means at the control areas in said first control section corresponding to a code means at a control area in said second control section, and means for preventing completion of one of said second circuits while said carrier moves along said first control section and for preventing completion of one of said first circuits while said carrier moves along said second control section including control means on said carrier operable between first and second conditions wherein said control means connects said first plurality of circuits for operation and disconnects said second plurality of circuits and connects said second plurality of circuits for operation and disconnects said first plurality of circuits, respectively, and trip means along said trackway and between said control sections for actuating said control means from its first to its second condition.

(References on following page)

References Cited by the Examiner

UNITED STATES PATENTS

| | | | |
|---|---|---|---|
| 1,381,317 | 6/1921 | Loughridge | 104—88 |
| 1,934,377 | 11/1933 | Robbins | 198—38 |
| 2,060,759 | 11/1936 | Jennings | 198—38 |
| 2,614,506 | 10/1952 | Muellerheim | 104—88 |
| 2,688,931 | 9/1954 | Spafford | 104—88 |
| 2,688,932 | 9/1954 | Heil | 104—88 |
| 2,688,934 | 9/1954 | Quail | 104—88 |
| 2,796,968 | 6/1957 | Burrows | 198—38 |
| 2,803,333 | 8/1957 | Freeman. | |
| 2,896,769 | 7/1959 | Freeman et al. | 198—38 |
| 2,902,945 | 9/1959 | Simon | 104—88 |
| 2,918,881 | 12/1959 | Klamp | 104—88 |

FOREIGN PATENTS 487,860 12/1929 Germany.

ARTHUR L. LA POINT, *Primary Examiner.*

JAMES S. SHANK, EUGENE G. BOTZ, *Examiners.*